United States Patent
Wu et al.

(10) Patent No.: US 9,502,876 B2
(45) Date of Patent: Nov. 22, 2016

(54) POWER CORD INTEGRATED HANGER SYSTEM FOR SUSPENDING A LIGHTING FIXTURE

(75) Inventors: Xiaoping Wu, Richmond, CA (US); Mohammad Zafar Shahbaz, Richmond, CA (US)

(73) Assignee: ABL IP Holding, LLC, Conyers, GA (US)

( * ) Notice: Subject to any disclaimer, the term of this patent is extended or adjusted under 35 U.S.C. 154(b) by 0 days.

(21) Appl. No.: 12/841,892

(22) Filed: Jul. 22, 2010

(65) Prior Publication Data

US 2012/0018212 A1    Jan. 26, 2012

(51) Int. Cl.
| | |
|---|---|
| *H02G 3/04* | (2006.01) |
| *H02G 3/30* | (2006.01) |
| *F21V 21/104* | (2006.01) |
| *F21V 21/112* | (2006.01) |
| *F21S 8/06* | (2006.01) |

(52) U.S. Cl.
CPC ............... *H02G 3/30* (2013.01); *F21V 21/104* (2013.01); *F21V 21/112* (2013.01); *F21S 8/06* (2013.01)

(58) Field of Classification Search
CPC ........ H02G 7/12; H02G 7/125; H02G 7/053; H02G 3/20; H01B 11/06; H01B 11/08; H01B 7/17; H01B 7/18; H01B 11/18; H01B 7/00; H01B 7/0869; H01B 7/20; H01B 7/201; H01B 7/202; H01B 7/204; H01B 7/205; H01B 7/207; H01B 7/208; H01B 7/22; H01B 7/221; H01B 7/223; H01B 7/225; F21V 21/104; F21V 21/112; F21S 8/06
USPC ............. 248/343; 174/40, 50, 60, 36, 102 R, 174/102 A, 103, 106 R, 108, 113 R, 110 R, 174/112 R, 10, 24, 23 R
See application file for complete search history.

(56) References Cited

U.S. PATENT DOCUMENTS

| | | | | |
|---|---|---|---|---|
| 2,589,507 | A | * | 3/1952 | Noyes .................... H01B 5/10 174/102 E |
| 3,459,871 | A | | 8/1969 | Eager, Jr. et al. |
| 3,512,743 | A | * | 5/1970 | Lipscomb ..................... 248/324 |
| 3,843,829 | A | * | 10/1974 | Bridges .................... H01B 7/04 174/103 |
| 3,946,467 | A | * | 3/1976 | Lukas et al. .................... 24/537 |
| 4,006,289 | A | * | 2/1977 | Roe et al. .................. 174/102 R |
| 4,207,427 | A | | 6/1980 | Beretta et al. |
| 4,536,610 | A | | 8/1985 | Giussani |
| 5,273,452 | A | | 12/1993 | Donato et al. |
| 5,408,560 | A | * | 4/1995 | Seynhaeve et al. .......... 385/101 |
| 5,428,187 | A | * | 6/1995 | Crane et al. .................... 174/36 |
| 5,794,894 | A | * | 8/1998 | Fremund ......................... 248/53 |
| 6,018,874 | A | | 2/2000 | Todd |
| 6,111,194 | A | * | 8/2000 | Kroulik ........................... 174/47 |
| 6,259,031 | B1 | * | 7/2001 | Totland ............... H01B 7/1895 174/110 R |
| 6,350,947 | B1 | | 2/2002 | Bertini et al. |
| 6,428,190 | B1 | | 8/2002 | Herst et al. |

(Continued)

*Primary Examiner* — Angel R Estrada
*Assistant Examiner* — Pete Lee
(74) *Attorney, Agent, or Firm* — Beeson Skinner Beverly, LLP (57) ABSTRACT

A power cord integrated hanger system for suspending a lighting fixture has a flexible load bearing inner suspension part and a flexible non-load bearing outer conductor part that acts as the "power cord" for the suspended lighting fixture. The flexible outer conductor part has an internal passageway for the inner suspension part. An outer cover of the outer conductor part holds electrical conductors in place in the outer conductor part and preferably conceals the conductors from view. The outer cover of the conductor part can be provided with different aesthetic qualities to enhance the visual appearance of the hanger system.

23 Claims, 12 Drawing Sheets

(56) References Cited

U.S. PATENT DOCUMENTS

| | | | |
|---|---|---|---|
| 6,761,342 B1* | 7/2004 | Giefer et al. | 248/343 |
| 6,903,277 B2* | 6/2005 | Whidden | H01B 9/029 |
| | | | 174/106 R |
| 7,335,836 B2* | 2/2008 | Arakawa | F16G 11/04 |
| | | | 174/36 |
| 7,518,063 B2 | 4/2009 | Zhang et al. | |
| 7,563,981 B2* | 7/2009 | Ichikawa et al. | 174/72 A |
| 7,592,548 B2* | 9/2009 | Marszalek et al. | 174/113 R |
| 8,272,769 B2* | 9/2012 | Bassani | F21S 8/065 |
| | | | 362/405 |
| 2007/0246631 A1* | 10/2007 | Brown et al. | 248/343 |
| 2012/0067020 A1* | 3/2012 | Paddock et al. | 57/17 |

* cited by examiner

POWER CORD INTEGRATED HANGER SYSTEM FOR SUSPENDING A LIGHTING FIXTURE

BACKGROUND

The present invention generally relates to the installation of electric lighting fixtures, and more particularly to the installation of ceiling suspended lighting fixtures having electrical power cords that must be extended between the fixtures and the overhead ceiling.

Lighting designs for architectural spaces frequently include lighting fixtures suspended from an overhead ceiling structure where the lighting fixtures become an architectural element within the space. In office environments, a typical lighting installation will include the suspension of runs of direct or indirect, or direct/indirect, lighting fixtures below a ceiling such as a grid ceiling from multiple suspension points located on the ceiling. Each run of fixtures will require at least one power feed location where a potentially unsightly power cord must be run from the lighting fixture up to an electrical junction box above the ceiling. In older installations, the runs of lighting fixtures were often suspended by rigid hollow stems which permitted the fixture's power cord to be fed through the stem at the power feed locations. The rigid stems concealed the power cords and provided a clean, finished look to the installation. However, rigid stem designs became impractical with the introduction of earthquake building codes in earthquake-prone areas, such as California, which require that a fixture be allowed to sway during a seismic event.

One response to earthquake codes was to use ball stems having a ball joint that permitted a suitable swivel motion about the stem. This solution preserved the advantage of being able to hide the power cord since, like rigid stems, ball stems are hollow so that the power cord can be passed through the stems. However, ball stems are relatively costly and difficult to install. As a result, aircraft cable is now widely used to suspend lighting fixtures from overhead ceiling structures. Aircraft cable has a high degree of flexibility and has high tensile strength. It is also inexpensive and easy to install, and allows the fixture the freedom to sway, thereby meeting earthquake codes.

The problem with aircraft cable is that the power cords for electrifying the lighting fixtures must be dropped next to the cable. Power cords are visually objectionable and detract from the finished appearance of lighting installation. To mitigate this problem, different techniques have been devised to hold the power cord next to the aircraft cable so that the power cord runs parallel to the cable. Such techniques include the use of cable ties or clips, and cord managers such as disclosed in U.S. Pat. No. 6,428,190. However, ties, clips and cord managers fail to hide the power cord and themselves create visual detractions. Cord managers can also inhibit the ability of the fixture to sway during seismic events.

To overcome the objections to external power cords, a hanger system has been devised that is both flexible and hides the power cord within the hanger. In this prior hanger design, the electrical wiring is encased in an outer metal flexible sheath with attachment hardware connected to the ends of the sheath that allow the hanger to be attached to the lighting fixture at one end and to a junction box in the overhead ceiling at the other. The difficulty with this solution is that the connections between the attachment hardware and the flexible outer sheath create structural weak points along the length of the hanger, which compromise the hanger's load bearing capacity. Also, while having a degree of flexibility, the metal sheath is not sufficiently flexible to allow the suspended fixture to experience a large degree of sway, with the sway generally being limited to a range of around +/-10 degrees from vertical.

SUMMARY OF INVENTION

The present invention provides a power cord integrated hanger system for suspending the power feed end of a lighting fixture below a ceiling structure. The hanger system of the invention completely hides the power cord while having a high load bearing capability. The invention further provides a hanger system having a high degree of flexibility, allowing the suspended lighting fixture to sway relatively freely during seismic events, up to +/-90 degrees from vertical. Hanger systems in accordance with the invention can be used to hang lighting fixtures below grid ceilings and other ceiling structures, and can be easily installed.

The power cord integrated hanger system of the invention includes a flexible load bearing inner suspension part and a flexible non-load bearing outer conductor part that acts as the "power cord" for the suspended lighting fixture. The inner suspension part is comprised of a strong flexible cable, such as aircraft cable, and bears the load of the lighting fixture. The flexible outer conductor part has an internal passageway, and electrical conductors running through it. An outer cover, which forms part of the outer conductor part, holds the electrical conductors in place and preferably conceals the conductors from view. The outer cover of the conductor part can be provided with different aesthetic qualities to enhance its visual appearance.

When installed, the non-load bearing conductor part surrounds the suspension cable so that the suspension cable is completely or substantially hidden from view. When installed, the outer conductor part of the hanger system becomes the visually dominant part of the system, and the hanger system will take on the external appearance of this visually dominant part. At the same time, the outer conductor part of the hanger system effectively manages the electrical conductors used to supply electrical power to the lighting fixture. It prevents tangles of wires that can occur where a plurality of electrical wires are used to wire the lighting fixture. The result is a hanger system for the feed end of a lighting fixture that presents a clean, finished look for a finished ceiling appearance.

In another aspect of the invention, a method is provided for hanging the power feed end of a lighting fixture without an external power cable in an installation that allows the lighting fixture to freely sway during a seismic event. The method comprises the following steps, preferably but not necessarily in the following order: electrically connecting one end of a non-load bearing flexible outer conductor part of a hanger system to the power feed end of a lighting fixture; connecting one end of a flexible load bearing suspension part to the feed end of the lighting fixture proximate the outer conductor part; using its free end, inserting the flexible suspension part through a passageway in the flexible outer conductor part such that the outer conductor part surrounds the inner suspension part; connecting the free end of the suspension part to a structural member in the overhead ceiling, such as a cable gripper in a junction box; and then electrically connecting conductors extending from the top end of the outer conductor part to electrical wiring in the ceiling.

DESCRIPTION OF THE ILLUSTRATED EMBODIMENT

Figures 1A, 1B:
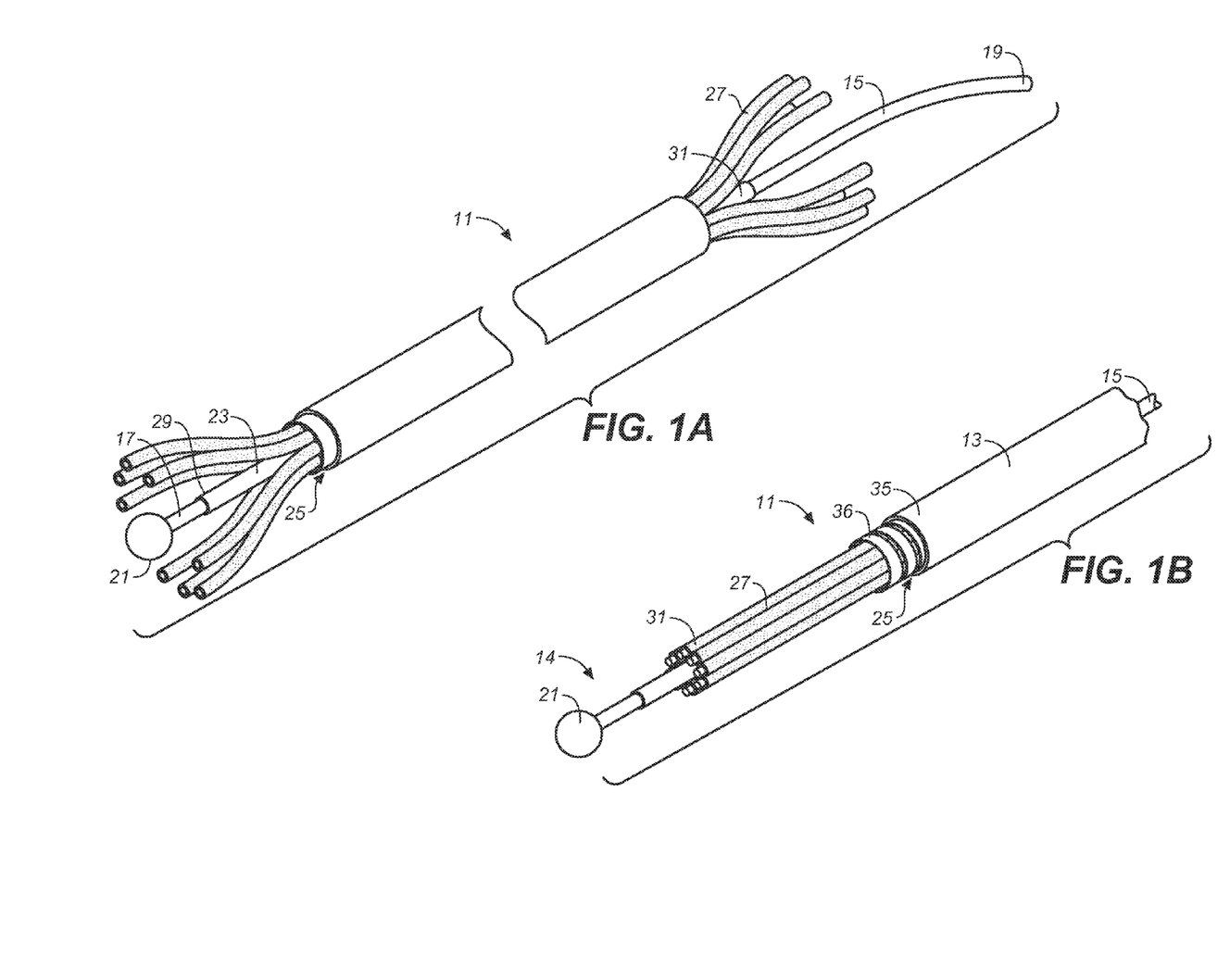
FIG. 1A is a perspective view of a power cord integrated hanger system in accordance with the invention.
FIG. 1B is another partial perspective view thereof, which is partially cut away to show the internal elements of the hanger system.
Figure 2:
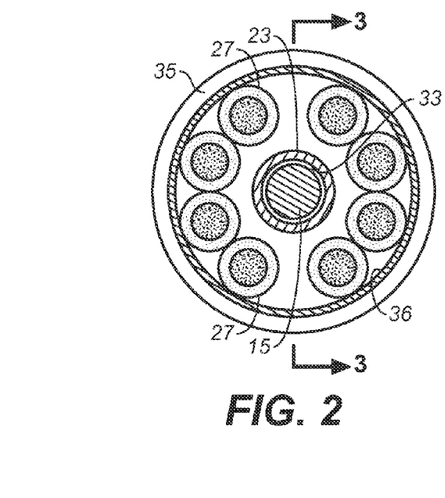
FIG. 2 is a transverse cross-sectional view of an exemplary power cord hanger system in accordance with the invention, showing an integrated power cord consisting of eight conductors.
Figure 3:
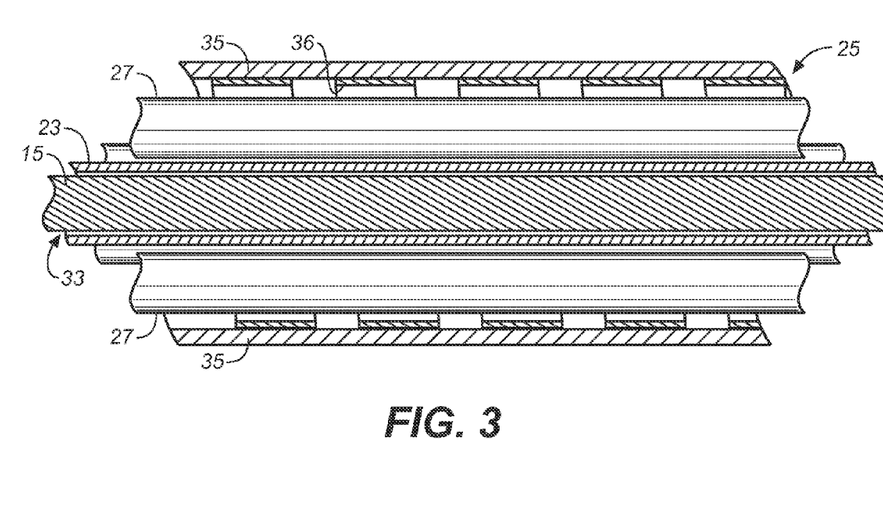
FIG. 3 is a longitudinal cross-sectional view thereof taken along lines 3-3 in FIG. 2.

Referring now the drawings, FIGS. 1-3 illustrate an embodiment of a power cord integrated hanger system 11 in accordance with the invention, which is comprised of an elongated and flexible non-load bearing conductor part denoted by the numeral 13, and an elongated and flexible load bearing suspension part denoted by the numeral 14. The suspension part is comprised of a flexible suspension cable 15 having a bottom end 17, a top end 19, and a length exceeding the length of the conductor part. The length of the suspension cable is chosen in accordance with the desired suspension height of the lighting fixture.

The suspension cable 15 is preferably aircraft cable commonly used to suspend architectural lighting fixtures. Aircraft cable, which is made up of multiple strands of steel wire, has high tensile strength and is highly flexible. However, it is not intended that the flexible suspension part of the invention be limited to the use of aircraft cable. Other types of cable could be used, provided the cable has sufficient tensile strength and is sufficiently flexible to allow the suspended lighting fixture to sway relatively freely.

The bottom end 17 of the suspension cable can be provided with an enlarged capture element, such as the ball 21 shown in FIGS. 1A and 1B. The capture element can be used to connect the bottom end 17 of the cable to the feed end of the lighting fixture by a capture structure on the lighting fixture such as hereinafter described. It will be understood that capture elements other the illustrated ball could be used, such as a cylindrically shaped capture element. It will also be understood that that suspension could be provided without a capture element. In this case, the bottom end of the cable could be connected to the feed end of the lighting fixture any suitable means, such as looping the end of the cable through a structural component of the fixture and tying off the cable end or using fasteners or cable grippers.

The flexible conductor part of the illustrated power cord hanger system 11 includes an inner core 23, an outer cover 25 and electrical conductors, such as conductor wires 27, between the inner core and outer cover. The inner core is an elongated element having a first end 29 and second end 31, which, except for the conductor wires, generally defines the length of the conductor part. The inner core is also hollow, and preferably tubular in shape, to provide a center passageway 33 through the outer conductor part for receiving the suspension cable. Preferably, the inside diameter of the hollow core is somewhat larger than the outside diameter of the suspension cable to allow the suspension cable to easily slide through the inner core of the outer part when the lighting fixture is installed. The inner core is suitably fabricated of a durable and flexible plastic material such as nylon.

Figure 4A:
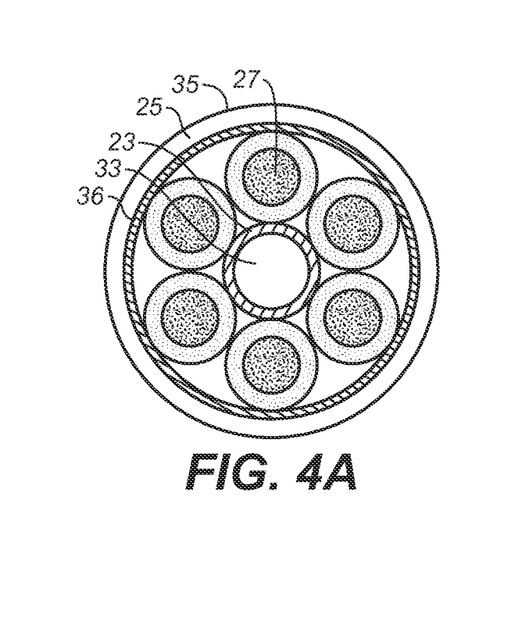
FIGS. 4A and 4B are transverse cross-sectional views of other versions of a power cord integrated hanger system in accordance with the invention showing examples of different possible wire and wire gauge combinations that can be used in the hanger system.
Figure 4B:
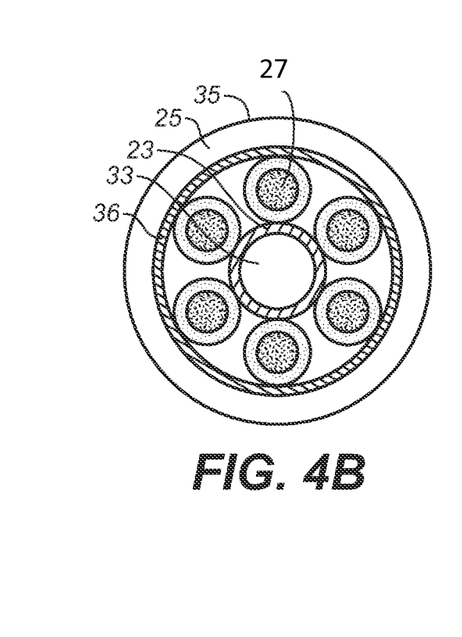

The conductor wires 27 surrounding the inner core extend beyond the ends of the conductor part, so that they can be connected at one end to the lighting fixture and at the other end to wiring in the ceiling from which the fixture is suspended. The conductor wires are completely captured between the inner core and outer cover of the conductor part, and different numbers of wires of different gauges can be provided as required by the particular application. FIGS. 4A and 4B illustrate examples of a six wire outer conductor part using 14 gauge wire (FIG. 4A) and 18 gauge wire (FIG. 4B).

The outer cover 25 surrounding the wire conductors preferably has a length comparable or suitably somewhat shorter than the length of the inner core. Like the inner core, the outer cover of the conductor part can at least in part be fabricated of a plastic material, suitably a polyvinyl chloride (PVC) plastic. The plastic could be transparent, translucent or opaque. In one conception, shown in the drawings, the outer cover is comprised of an outer transparent jacket 35, suitably made of a clear PVC plastic, and a shielding means, denoted by the numeral 36 in FIGS. 2 and 3, behind the clear plastic jacket which conceals the wire conductors. The shielding means can, for example, be a thin metal strip, such as a tinned copper strip, wrapped around the conductor wires. A filler material (not shown), such as a fibrillated polypropylene, can be placed behind the shielding as a filler. The filler material will fill gaps in the shielding and maintain the round shape of the outer cover.

A length of aircraft cable having a diameter of 1/16 inches can be used for the suspension part hanger system. The following are exemplary dimensions for the conductor part of the hanger system for different numbers of wires and different wire gauges that can be used with 1/16 inch diameter aircraft cable:

| Wire Gauge | No. of Wire | Overall Diameter of Outer part | Diameter of Individual Wires | Core Outer Diameter | Core Inner Diameter |
| --- | --- | --- | --- | --- | --- |
| 14 | 3, 4, 5 & 6 | 0.430 | 0.113 | 0.110 | 0.080 |
| 16 | 3, 4, 5 & 6 | 0.400 | 0.101 | 0.110 | 0.080 |
| 18 | 3, 4, 5 & 6 | 0.377 | 0.089 | 0.110 | 0.080 |
| 20 | 3, 4, 5 & 6 | 0.358 | 0.079 | 0.110 | 0.080 |
| 22 | 3, 4, 5 & 6 | 0.348 | 0.074 | 0.110 | 0.080 |
| 24 | 3, 4, 5 & 6 | 0.330 | 0.065 | 0.110 | 0.080 |

It is noted that the above exemplary dimensions for the inner core 23 will produce a clearance between aircraft cable and core, the diameter of the aircraft cable being 0.0175 inches smaller than the core inside diameter. This clearance will allow the cable to readily slide through the core of the outer conductor part. If other cable sizes are used (examples would be aircraft cables having a diameter of 3/64, 3/32 or 1/8 inch), the dimensions of the outer conductor part, including the inner core, would be adjusted as needed.

It is also noted that a hanger system in accordance with the invention can be provided wherein the inner core 23 of the outer conductor part 13 is sized such that the inner suspension part 14 fits tightly within the outer conductor part. In this case, the hanger system would be shipped to the job site preassembled and the preassembled system then installed as a unit. However, it is found that installation of the hanger system can be facilitated if the inner suspension part 14 can slide within the outer conductor part so these two parts of the hanger system can be provided separately to the job site and installed separately such as in the manner described later below.

Figure 5:
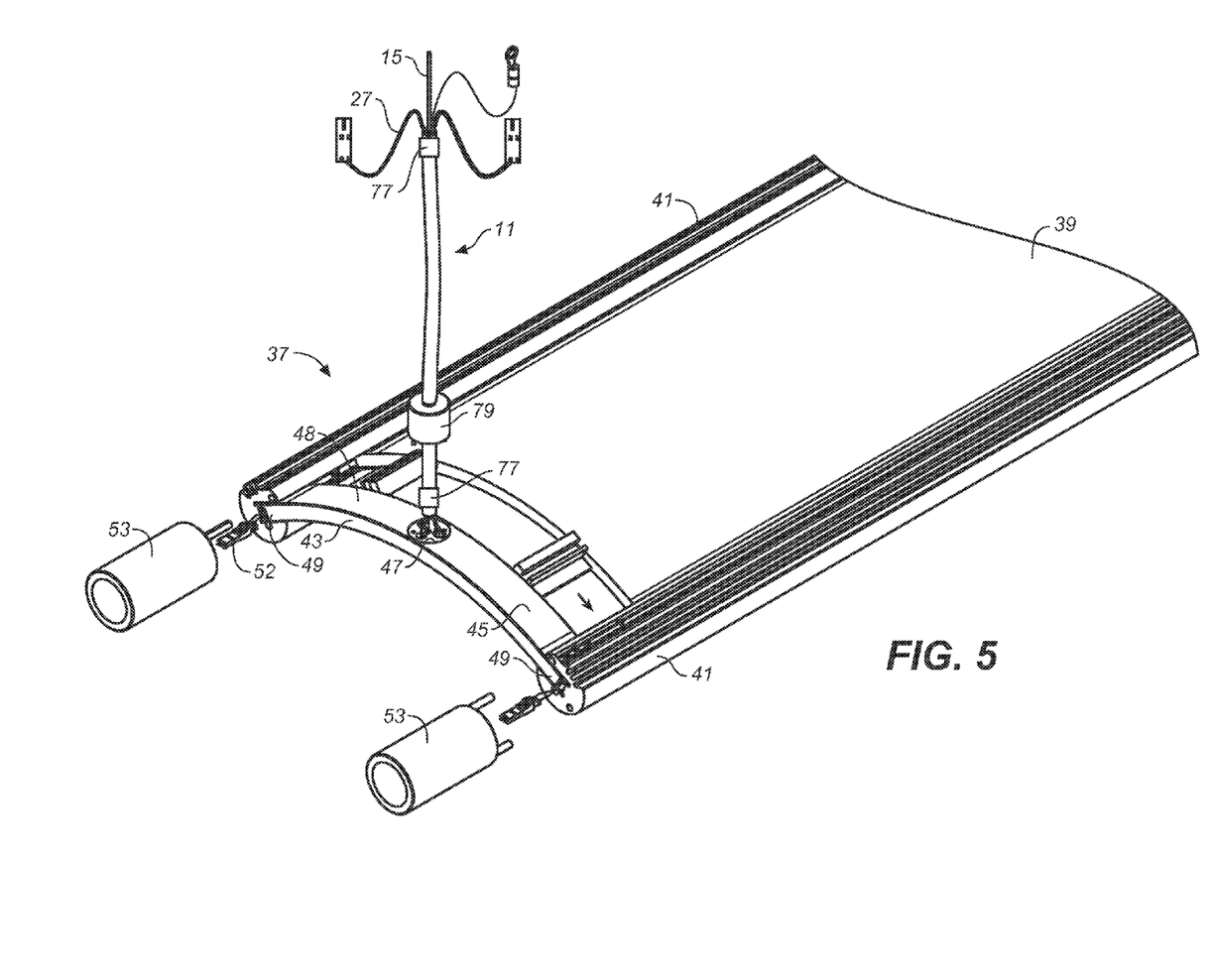
FIG. 5 is a perspective view of a power cord integrated hanger system in accordance with the invention and an exemplary lighting fixture with which the hanger system can be used.

FIG. 5 shows how the illustrated power cord integrated hanger system 11 described above might be used to suspend the feed end of a lighting fixture. Here, the exemplary lighting fixture is in the form of an LED waveguide lighting fixture 37 having a light waveguide 39 supported by elongated heat dissipating edge support rails 41, each of which contains a strip of LEDs (not shown) for feeding the edges of the light waveguide. Curved bridge supports, such as the illustrated bridge support 43, connect the ends of support rails and provide structures to which suspension hardware can be attached. Bridge support 43 is hollow and has a top wall 45 with a top connector port 47, and arms 48 terminating at open ends 49. The top connector port of the bridge provides a capture structure through which the ball end 21 at the bottom of the aircraft cable 15 can be inserted; it also has wire holes 51 through which the conductor wires can be threaded when installing the hanger system as hereinafter described. Wires from the hanger system that are threaded through the bridge can be connected to lead wires from the LED strips in the fixture's support rails at the ends of the bridge support. The wire connections are suitably made by wire connectors 52, which can be covered by aesthetically pleasing end caps 53.

Figure 6A:
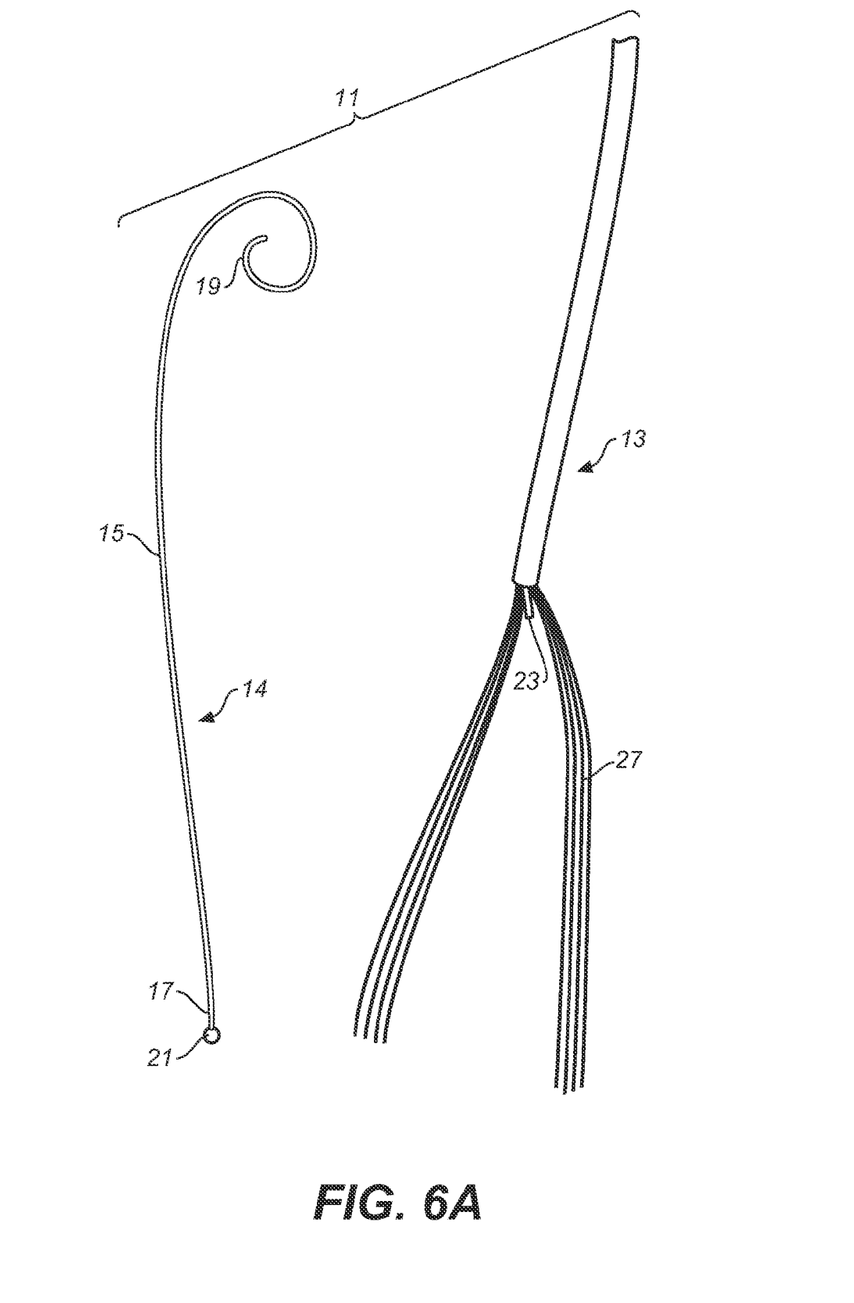
FIGS. 6A-6F illustrate a sequence of steps for installing a power cord integrated hanger system in accordance with the invention.
Figure 6B:
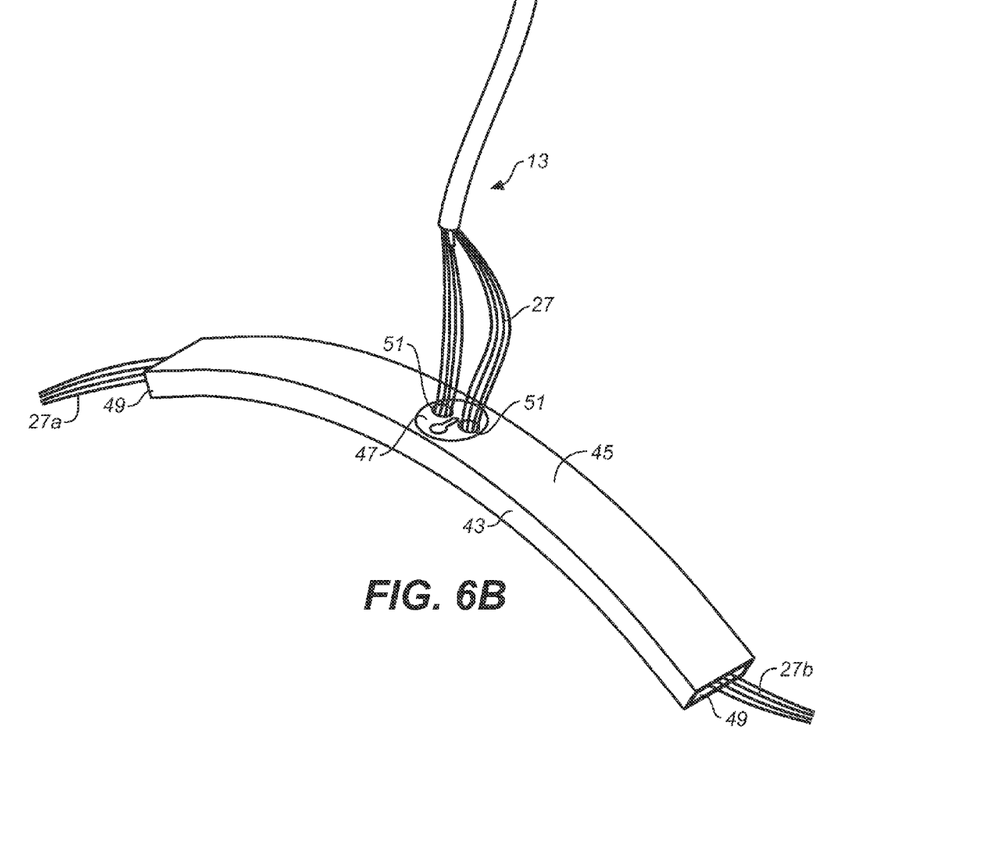
Figure 6C:
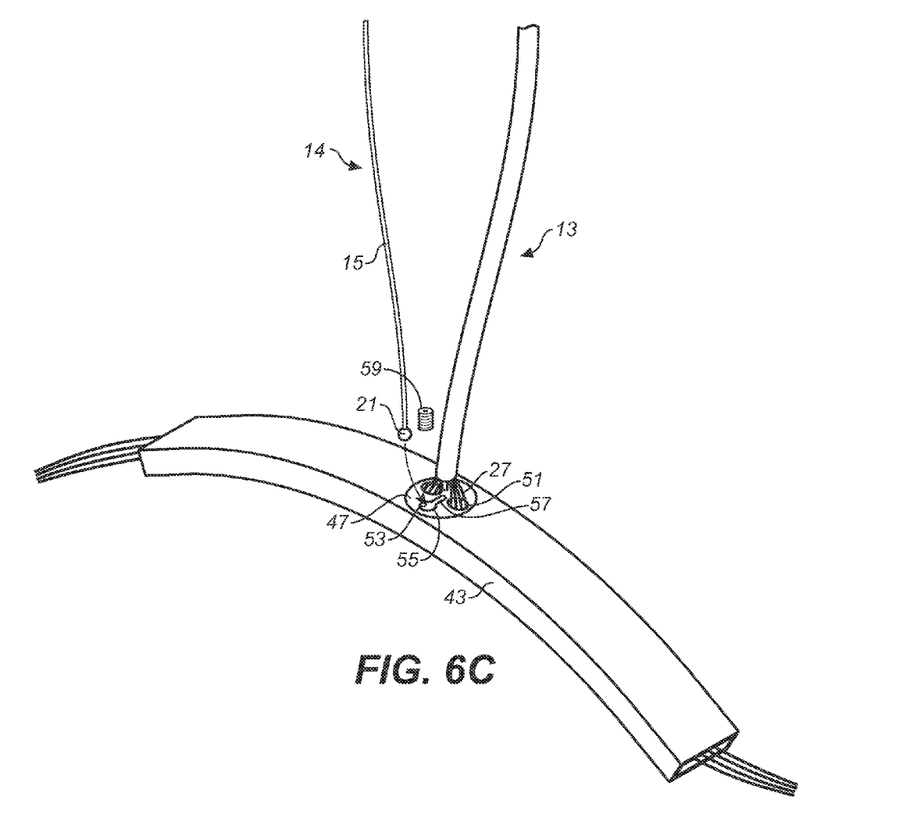
Figure 6D:
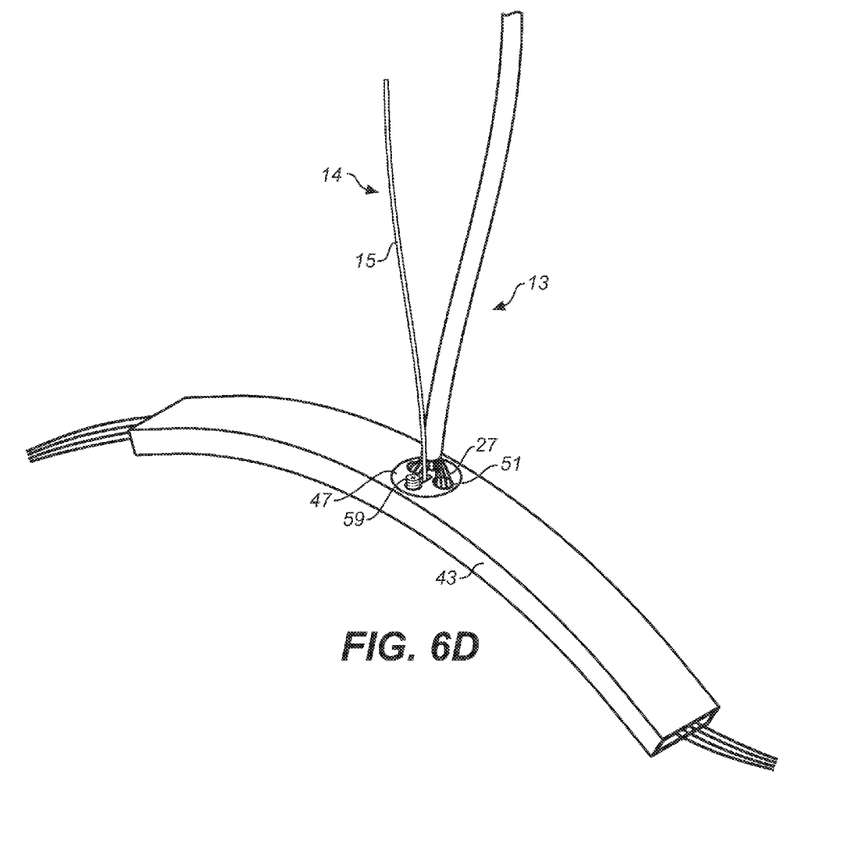

FIGS. 6A-6F illustrate a sequence of steps that can be taken to install the hanger system 11 above described for suspending the feed end of the waveguide lighting fixture shown in FIG. 5. It is first noted that the inner suspension and outer conductor parts 13, 14 of the hanger system can be supplied separately to the job site as indicated in FIG. 6A. The preferred initial installation step is shown in FIG. 6B, where the conductor wires extending from the bottom end of the outer conductor part are shown being threaded through the bridge support. This is done by selecting out groups of wires for each arm of the bridge support and threading them through one or the other of the wire holes 51 in the top wall 45 of bridge support 43 such that the selected groups of wires pass through each of the two arms of the bridge support and out through the bridge arms open ends 49 as shown by wire ends 27a, 27b, where they can be connected to the LED lead wires (not shown). The aircraft cable 15 can then be installed by inserting the ball 21 at bottom end of the cable into the enlarged end 53 of key slot 55, which is provided in the top wall of the bridge support adjacent wire holes 51. Once inserted, the ball end of the aircraft cable is moved laterally such that the cable slides into the slot end 57 of the key slot, which is dimensioned to capture the ball behind the slot. A set screw 59 can now be screwed into the key slot's enlarged end to lock the cable in place. See FIG. 6D. The key slot's enlarged end is internally threaded for this purpose.

Figure 6E:
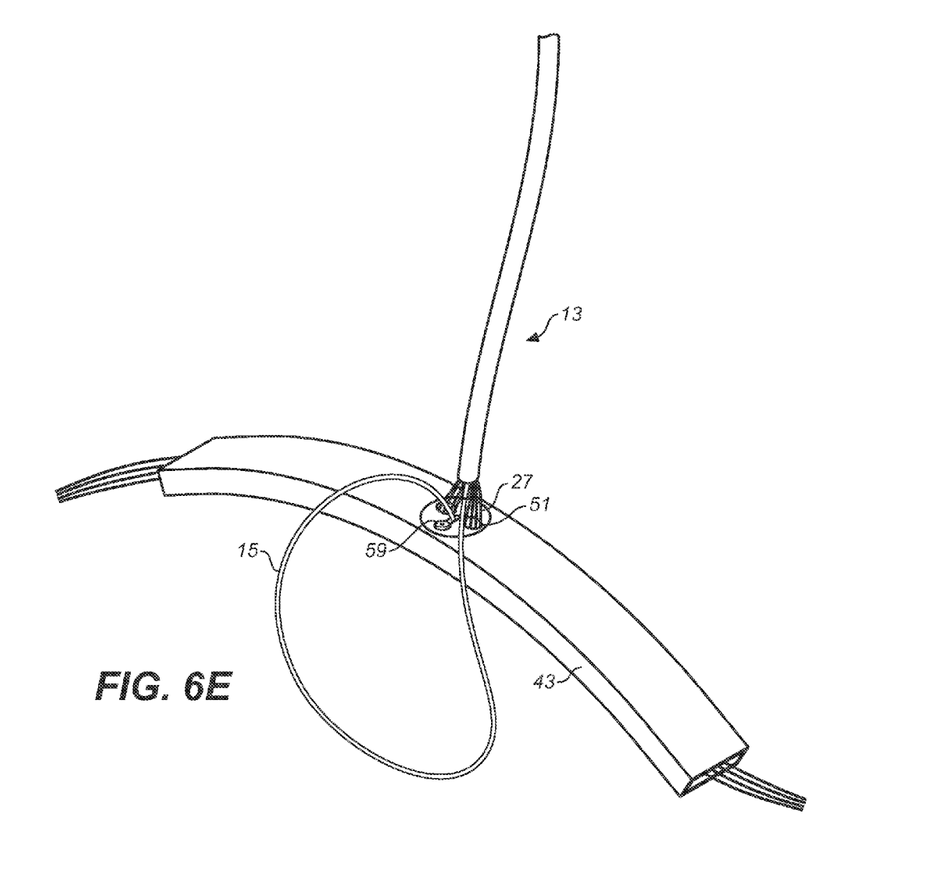
Figure 6F:
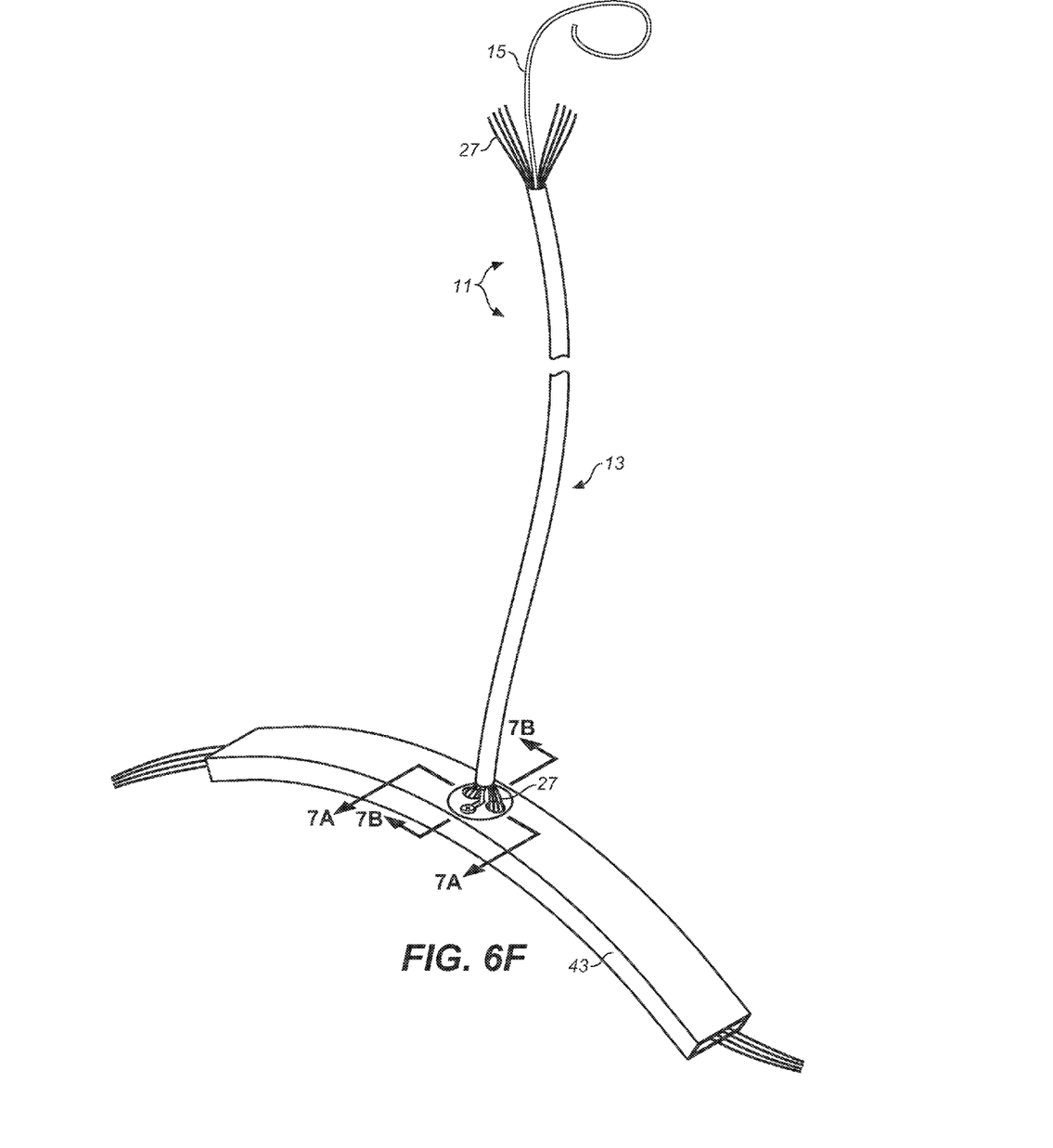

FIGS. 6E and 6F show how the aircraft cable, which provides the hanger system's suspension part, is installed in the hanger system's conductor part after the conductor wires of the conductor part have been threaded into the bridge support 43 and connected to the LED lead wires, and after the ball end of the aircraft cable is locked into the bridge support. This is accomplished by taking the free end of the aircraft cable and inserting it into the bottom end of the conductor part's hollow inner core 23, as shown in FIG. 6E, and sliding the cable through the center passageway of the inner core and out the other end of the core, as shown in FIG. 6F.

Figure 7A:
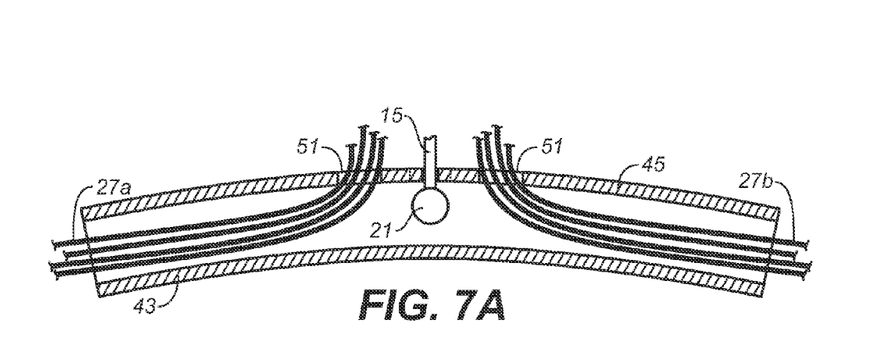
FIGS. 7A and 7B are cross-sectional views of the lighting fixture bridge support shown in FIGS. 5 and 6B-6F, and showing the bottom end of hanger system in accordance with the invention connected to the bridge support.
Figure 7B:
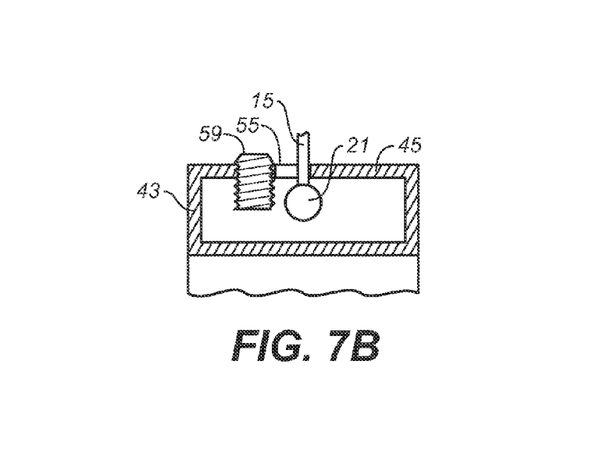

FIGS. 7A and 7B illustrate the inside of the top of the bridge support after the wiring and cable connections are made. Shown is the ball end 21 of the aircraft cable retained behind the top wall of bridge support 43, and the conductor wires 27 passing through the wire holes 51 of the top wall. The key slot capture structure 55 is preferably located at the apex of the curved bridge support.

At the bottom end, the power cord integrated hanger system is wired to the feed end of the lighting fixture, and after the aircraft cable is attached to the fixture and inserted up through the inner core of the hanger system as above described, the feed end of the fixture can be hung from a junction box ("J-box") in an overhead ceiling. Hanging the feed end of a lighting fixture is generally illustrated in FIG. 8.

Figure 8:
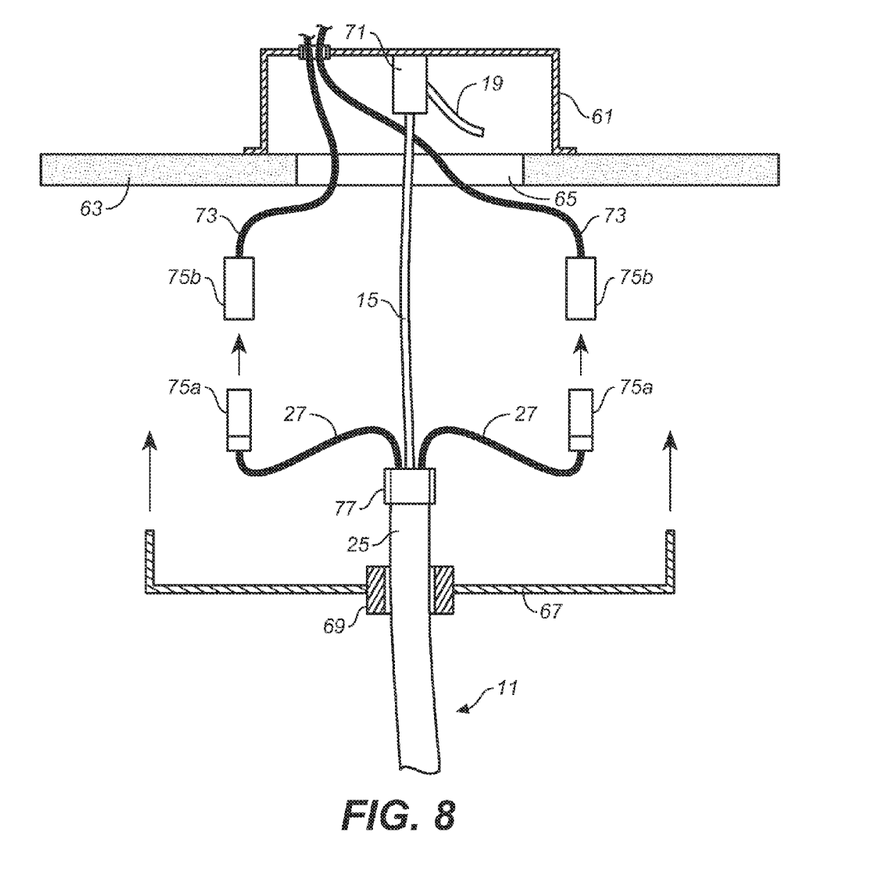
FIG. 8 illustrates exemplary means of attaching the top end of a power cord integrated hanger system in accordance with the invention to a junction box of an overhead ceiling, including making electrical connections at the ceiling.

FIG. 8 graphically illustrates a J-box 61 behind a ceiling 63 having a cut-out 65 for the J-box. The ceiling could be a grid ceiling where the J-Box is supported behind a cut-out in the ceiling tiles, or a structural ceiling with an embedded J-box. The top end of the power cord integrated hanger system 11 is passed through a canopy 67 having a center opening and bushing 69 in the center opening. The bushing provides a finished look to the outside of the canopy and will eliminate sharp edges that could cut into the jacket of the hanger. The canopy, in turn, provides a finished look where the hanger system enters the ceiling. The canopy can be held against the ceiling by any suitable attachment means (not shown). For example, magnets can be provided in the J-Box to magnetically attract and hold a canopy 67 against the ceiling. Alternatively, a mechanical attachment means could be used, such as screws inserted through screw holes in the canopy.

When ready to hang, the fixture can be supported at its desired suspension height and location with the feed end of the fixture below the J-box. To hang the feed end of the fixture, the top end 19 of the aircraft cable 15 can be inserted into an adjustable side exit cable gripper 71 provided in the J-Box, and the cable secured at the point that provides a desired suspension height. The excess length of the cable is then simply coiled up within the J-box. The conductor wires 27 of the hanger system can then be connected to the building wires 73 in the J-box. Electrical connectors, such as Molex connectors 75a, 75b, are suitably provided on the wire ends to facilitate the wire connections.

It is noted that, as seen in FIGS. 5 and 8, the outer cover of the outer part of the hanger system is preferably capped at its terminal points by terminus caps 77, which can be metal caps crimped onto the ends of the jacket. The terminus caps keep the cover from fraying and keep the wires more or less organized as they emerge from the ends of the outer cover of the hanger system. It is also noted that, as shown in FIG. 5, a finishing cap 79 can be provided at the bottom of the hanger system to hide the connections at the connector port 47.

While the present invention has been described in considerable detail in the foregoing specification and the accompanying drawings, it is not intended that the invention be limited to such detail. Embodiments of the invention other than described herein and which would be consistent with the spirit and scope of the invention would be apparent to persons of ordinary skill in the art.

What we claim is:

1. A power cord integrated hanger system for suspending the feed end of a lighting fixture at a desired suspension height comprising an elongated and flexible outer conductor part having a flexible elongated inner hollow core providing a center passageway through the flexible outer conductor part, electrical conductors distributed around said inner core, and a flexible elongated outer cover surrounding said electrical conductors wherein the electrical conductors are captured between said inner core and outer cover, and an elongated and flexible inner suspension part having a first end and second end defining a length, the length of said suspension part being longer than the length of the elongated inner core and the outer cover of said conductor part and being chosen in accordance with the desired suspension height of a lighting fixture to be suspended, said elongated and flexible inner suspension part being insertable through and being sized to slide within the center passageway of said outer conductor part.

2. The hanger system of claim 1 wherein the outer cover of said outer conductor part substantially conceals the electrical conductors of said outer conductor part.

3. The hanger system of claim 1 wherein said outer conductor part has a sufficient length to conceal the inner suspension part over a substantial portion of the length thereof.

4. The hanger system of claim 1 wherein the flexible inner core is fabricated of a durable plastic material.

5. The hanger system of claim 1 wherein the flexible inner core of said outer conductor part is fabricated of a durable plastic material.

6. The hanger system of claim 1 wherein the flexible outer cover of said outer conductor part is fabricated of a PVC plastic.

7. The hanger system of claim 1 wherein the inner core of said outer conductor part is tubular in shape and has an inside diameter, wherein the flexible inner suspension part has a diameter, and wherein the inside diameter of the inner tubular core is greater than the diameter of the suspension part by about 0.0175 inches or less.

8. The hanger system of claim 1 wherein said outer conductor part further includes shielding means between the electrical conductors and the outer flexible cover thereof.

9. The hanger system of claim 1 wherein the outer cover of said flexible outer conductor part has defined ends past which the electrical conductors of said outer conductor part extend, and wherein the flexible outer conductor part further includes terminus caps that cap the ends of said outer cover.

10. The hanger system of claim 1 wherein the electrical conductors of said outer conductive part include wire sizes selected from the group consisting of No. 14 gauge wire, No. 16 gauge wire, and No. 18 gauge wire.

11. The hanger system of claim 1 wherein the inner core of said outer conductor part is tubular in shape and has an inside diameter of about 0.080 inches.

12. A power cord integrated hanger system for suspending the feed end of a lighting fixture at a desired suspension height comprising an elongated and flexible outer conductor part having a flexible elongated inner tubular core having an outside and providing a center passageway through the flexible outer conductor part, electrical conductors running along the outside of said inner core, and a flexible elongated outer cover covering said electrical conductors and inner core, wherein the electrical conductors are captured between said inner core and outer cover, the outer cover of said outer conductor part having defined ends past which the electrical conductors and the flexible inner hollow core extend, and an elongated and flexible inner suspension cable having a characteristic diameter and having a first end and second end defining a length, the length of said suspension part being longer than the length of elongated inner tubular core and outer cover of said conductor part and being chosen in accordance with the desired suspension height of a lighting fixture to be suspended, and said suspension part being insertable through the center passageway of said outer conductor part, the flexible inner core of said outer conductor part having an inside dimension that allows the elongated and flexible inner suspension part to closely fit within and slide through the inner core of the outer conductor part when a lighting fixture is installed.

13. The hanger system of claim 12 wherein the inside diameter of the inner tubular core is greater than the diameter of the suspension part by about 0.0175 inches or less.

14. The hanger system of claim 12 wherein the outer cover of said outer conductor part has defined ends past which the electrical conductors extend, and wherein the flexible outer conductor part further includes terminus caps that cap the ends of said outer cover.

15. A power cord part for a power cord integrated hanger system for suspending the feed end of a lighting fixture at a desired suspension height, said power cord part comprising a flexible elongated inner hollow core providing a center passageway therethrough, electrical conductors distributed around said inner core, and a flexible elongated outer cover surrounding said electrical conductors, wherein the electrical conductors are captured between said inner core and outer cover, said flexible elongated inner hollow core, electrical conductors and flexible outer cover forming a flexible power cord having a center passageway extending through the power cord, said center passageway being sized to slidably receive a flexible suspension cable used to hang the feed end of the lighting fixture, wherein the power cord part covers the suspension cable and the length of the suspension cable is chosen in accordance with the desired suspension height of a lighting fixture to be suspended.

16. The power cord part of claim 15 wherein said flexible inner hollow core has an inside dimension that allows a flexible suspension cable to closely fit within the inner core when a lighting fixture is installed.

17. The power cord part of claim 16 wherein the inside dimension of said flexible inner tubular core is chosen to allow a flexible suspension cable to slide through the center passageway of the tubular inner core.

18. The power cord part of claim 16 wherein the outer cover has defined ends past which the electrical conductors and the flexible inner hollow core extend.

19. The power cord part of claim 18 further comprising terminus caps that cap the ends of said outer cover.

20. The hanger system of claim 15 wherein the flexible inner core of said outer conductor part is fabricated of a nylon plastic material.

21. The hanger system of claim 15 wherein the flexible outer cover of said outer conductor part is fabricated of a PVC plastic.

22. The power cord part of claim 18 further comprising terminus caps that cap the ends of said outer cover.

23. A power cord part for a power cord integrated hanger system for suspending the feed end of a lighting fixture at a desired suspension height, said power cord part comprising a flexible elongated tubular inner core having an outside and providing a center passageway therethrough, said flexible inner core being fabricated of a durable material, electrical wires running along said tubular inner core, and a flexible elongated outer cover covering said electrical conductors wherein the electrical wires are captured between said inner core and outer cover, the outer cover of the power cord part having defined ends past which the electrical wires and the flexible inner hollow core extend, said flexible elongated inner core, electrical conductors and flexible outer cover forming a flexible power cord having a center passageway extending through the power cord, said center passageway being sized to slidably receive a flexible suspension cable used to hang the feed end of the lighting fixture, wherein the power cord part covers the suspension cable and the length of the suspension cable is chosen in accordance with the desired suspension height of a lighting fixture to be suspended.

* * * * *